United States Patent
Peil

(10) Patent No.: US 10,059,526 B2
(45) Date of Patent: Aug. 28, 2018

(54) RAILING SUPPORT

(71) Applicant: KHS GmbH, Dortmund (DE)

(72) Inventor: Martin Peil, Dortmund (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/890,980

(22) PCT Filed: Apr. 19, 2014

(86) PCT No.: PCT/EP2014/001080
§ 371 (c)(1),
(2) Date: Nov. 13, 2015

(87) PCT Pub. No.: WO2014/183828
PCT Pub. Date: Nov. 20, 2014

(65) Prior Publication Data
US 2016/0083190 A1    Mar. 24, 2016

(30) Foreign Application Priority Data
May 16, 2013 (DE) .......................... 10 2013 105 018

(51) Int. Cl.
*B65G 21/00* (2006.01)
*B65G 21/20* (2006.01)

(52) U.S. Cl.
CPC ................. *B65G 21/2072* (2013.01)

(58) Field of Classification Search
CPC .................................................. B65G 21/2072
USPC ................................. 198/836.1–836.4, 860.3
See application file for complete search history.

(56) References Cited

U.S. PATENT DOCUMENTS

| | | | |
|---|---|---|---|
| 3,844,405 A * | 10/1974 | Shuford | B65G 21/2072 198/836.3 |
| 3,854,688 A | 12/1974 | Shuford | |
| 4,511,031 A * | 4/1985 | Lachonius | B65G 21/02 198/836.1 |
| 5,626,221 A | 5/1997 | Ledingham | |
| 5,692,596 A | 12/1997 | Ledingham | |
| 5,803,687 A * | 9/1998 | Ledingham | B65G 21/2072 198/836.3 |
| 6,189,685 B1 | 2/2001 | Ledingham | |
| 2010/0181169 A1* | 7/2010 | Petrovic | B65G 21/2072 198/836.1 |

FOREIGN PATENT DOCUMENTS

| | | |
|---|---|---|
| DE | 20 2007 001109 | 9/2007 |
| JP | 8-133444 | 5/1996 |
| WO | WO2003/042075 | 5/2003 |
| WO | WO2012/090079 | 7/2012 |

* cited by examiner

*Primary Examiner* — William R Harp
(74) *Attorney, Agent, or Firm* — Occhiuti & Rohlicek LLP

(57) ABSTRACT

A guide unit for a container-handling system includes a basic body portion having a format part, a railing support, and a railing crosspiece that are all integrated into a unitary piece. A container guide railing is arranged on the railing support. The railing crosspiece connects the basic body portion to the railing support.

25 Claims, 4 Drawing Sheets

RAILING SUPPORT

RELATED APPLICATIONS

This application is the national stage, under 35 USC 371, of international application PCT/EP2014/001080, filed on Apr. 19, 2014, which claims the benefit of the May 16, 2013 priority date of German application DE 102013105018.2, the contents of which are herein incorporated by reference.

FIELD OF INVENTION

The invention relates to container handling systems, and in particular, to guide units thereof.

BACKGROUND

Container handling systems have guide units that guide containers through the system from one processing station to the next. These processing stations carry out various processing steps, such as filling, closing, and labeling.

The guide units can also be those components that convey the containers to be treated from one container-handling system to another. Lateral guides are also provided to prevent containers from falling off the side of such a component.

The guide units, in particular rotary guide units, such as format parts designed like a star or system portions in which the container treatment takes place, are tailored to the properties of the container to be handled. Examples of such properties include container shape, container weight, and/or the container size. To permit a container handling system to be used for different containers, the guide units are at least partially exchangeable. As a result, installable format parts exist for different container types.

Container-guide railings arranged on the guide units are also tailored to container properties. Examples of such properties include the size and type of container. The container-guide railings are usually long guide rails that are arranged in adjacent railing supports that are spaced apart on the guide unit and along which the bottles slide in the container guide system.

As they move, the containers make direct contact with the guide rails. This tends to regularly wear out the guide rails. It is therefore advantageous, to be able to replace the guide rails easily.

In order to make it possible to install and/or replace the container guide railings in a safe and easy manner and to ensure reliable guidance of the containers against the container guide railing, the orientation of the railing supports relative to one another and/or the orientation of the railing supports on a basic body of the guide units, that is to say a basic body portion, must take place with a very high degree of accuracy.

Individual railing supports usually comprise a profile body of complex shape for holding the container guide railing. These railing supports are welded to a format part of the guide unit. The task of precisely orienting the large number of railing supports and to adjusting the railing supports if necessary consumes copious amounts of time. To make matters worse, the nature of the work is such that it is quite easy to make errors during the welding or adjustment process. As a result, it is not unusual for follow-up work to be required.

Another disadvantage of this prior art lies in the fact that, if the weld seams are not optimally produced, detachment of the connection and hence an undesired failure of the container guide railing may occur. Cracks or shrink holes in the weld seams may also make it considerably more difficult to clean such a system.

SUMMARY

Among the objects of the invention is that of providing a guide unit on which railing supports are oriented particularly easily with a high degree of precision. Also among the objects of the invention is that of providing a method for producing such a guide unit.

In one aspect of the invention, a guide unit includes a basic body portion, in particular a format part or guide part or guide railing, a railing support for arrangement of a container guide railing, and a railing crosspiece connecting the basic body portion and the railing support. The railing crosspiece is plastically deformed relative to the basic body portion. The plastic deformation of the railing crosspiece take places in a variety of ways, including but not limited to shear forming, helical twisting, bend forming, and bending.

Helical twisting is understood to mean a partial rotation about a longitudinal axis of the railing crosspiece. The helical twisting allows a particularly easy and precise orientation of the railing support relative to the basic body portion. It is thus possible, for example, to weld the railing support to the basic body portion and the railing crosspiece on a flat surface. The complicated orientation of the railing support on the basic body portion, which hitherto has been necessary prior to the welding operation, is no longer required or is considerably simplified by the fact that it rests flat against a support. The subsequent helical twisting can take place without changing the position of the railing support relative to the basic body portion. As a result, no further orientation of the railing support or of the railing crosspiece is necessary.

As used herein, "bending" is understood to mean a plastic deformation of the railing crosspiece by folding or turning over the edges with no twisting of the railing support about its longitudinal axis. This procedure is of great advantage particularly when the desired orientations of the railing support relative to the basic body portion in the installed position cannot be brought about by shear forming. This may be the case, for example, when the desired orientation of the railing support differs from its orientation at the time of production not only relative to the longitudinal axis but also relative to at least one axis having an orientation differing from the orientation of the longitudinal axis.

As used herein, a "basic body portion" refers to a portion of the guide unit. It may be, for example, a portion of a format part plane in the case of a multi-level format part, or a portion of the format part itself. It may also be, for example, a structural element that can be connected to the format part or the format part plane.

In some embodiments, the basic body portion and the railing crosspiece and/or the railing support are jointly formed in one piece.

Guide units, in particular format parts, can be prepared from a panel-shaped blank. In a one-piece construction, the railing crosspiece and the railing support are also jointly cut out of the panel-shaped blank as one piece.

In other embodiments, the basic body or the basic body portion, the railing crosspiece, and the railing support are jointly cut out of a panel-shaped blank as one piece. With this procedure, it is particularly advantageous that the railing support is already oriented in one plane relative to the basic body portion. The distances between the railing supports can also be produced particularly easily.

In other embodiments, the angle of twist of the railing crosspiece between the basic body portion and the railing support in the case of shear forming is between 15° and 135°. In some of these embodiments, the angle is 90°. In either case, tolerance ranges of, for example, ±5° are possible. The twisting takes place along the longitudinal axis in the region between a connection region of the railing crosspiece to the basic body and a connection region of the railing crosspiece to the railing support.

In this further embodiment, the railing support is oriented perpendicular or substantially perpendicular to the basic body portion. This is particularly advantageous if the container guide railing is configured as a push-in or push-on rail because such a configuration makes rapid replacement of the container guide railing possible.

In some embodiments, the guide units are flat, and container guidance takes place on their outer edges. Accordingly, the railing supports are arranged in a plane of the guide units.

In order to allow easy guidance, certain embodiments have railings that are arranged on an outer edge of the basic body portion and thus on an outer edge of the guide unit. If the basic body portion or the format part is flat, the arrangement of the railing support on an outer edge is particularly easy to implement and also ensures particularly good guidance of the containers.

Various embodiments of the invention differ in the manner in which they fasten the container guide railing to the railing support. In some embodiments, the container guide railing is pushed in the manner of a rail onto a railing support that is configured as a pin. In other embodiments, particularly those in which the container guide railing sustains a high load when guiding containers, a more secure and reliable connection of the container guide railing to the railing support is advantageous. An example of such a connection includes a U-shaped railing support. As a result, for example, a container guide railing having a T-shaped cross-section can be arranged on the railing support in a particularly secure and stable manner.

It is also possible, for example, to make the free leg ends thicker in order to achieve an undercut of the U-shaped support in the container guide railing. The undercut prevents any removal of the container guide railing from the railing support in the direction of the longitudinal axis of the railing crosspiece and nevertheless enables it to be pulled out transversely to the longitudinal axis of the railing crosspiece or transversely to a surface spanned by the U-shaped railing support.

In some embodiments, one or more edges of the railing support are deburred, chamfered, or rounded. This permits a particularly easy connection of the container guide railing to the railing support. Such embodiments have the benefit of protecting a person who is replacing the guide unit or otherwise operating the container handling system. This feature advantageously reduces the likelihood of injury and makes it possible to quickly replace the container guide railing from the railing support, and to do so with a reduced likelihood of causing damage.

A variety of materials can be used to make the guide unit. These include metal, plastic, and even stable wood or wood-based materials. In those applications that involve container handling systems for foodstuffs, the preferred material for the railing support, the railing crosspiece, and/or the body portion is stainless steel or a food-grade metal. This permits easy cleaning of the guide unit, as a result of which standards of the food industry can more easily be maintained.

The invention also solves the problem by a method for producing a guide unit for a container handling system, comprising the steps: producing a basic body blank of a guide unit comprising a basic body portion, a railing crosspiece and a railing support for arrangement of a container guide railing, and then plastically deforming the railing crosspiece.

As already mentioned, the guide unit may be produced, for example, by welding the railing crosspiece and the railing support to the basic body portion. However, preference is given to forming the basic body portion, the railing crosspiece and the railing support in one piece from a blank and then plastically deforming the railing crosspiece, for example by helically twisting or by bending the railing crosspiece. As a result, the orientation of the railing crosspiece relative to the basic body portion and/or the orientation of the railing crosspieces relative to one another is considerably simplified and is extremely precise.

When using particularly hard or brittle materials, it is also possible, for example, to treat at least the railing crosspiece beforehand, such as, for example, by a heating that precedes the plastic deformation.

In some embodiments, the basic body portion, the railing crosspiece, or the railing support may be punched out of a flat blank. In other embodiments, these are sawn out.

In yet other embodiments, a laser-cutting device cuts the railing crosspiece and the railing support out of the basic body blank on a basic body portion. The laser-cutting device makes it possible to cut out the railing crosspieces and/or railing supports in a particularly precise manner. As a result of this precision in cutting, it is possible to precisely arrange and orient even particularly small railing crosspieces and railing supports.

The plastic deformation, for example a helical twisting, can also be carried out particularly easily on a guide unit blank produced in this way, since the railing crosspiece and the railing support are already oriented in an exact manner relative to the plane of the basic body portion and only a twisting along the respective longitudinal axis of the railing crosspieces need take place.

In another aspect, the invention features a guide unit for a container handling system. Such a guide unit includes a basic body portion, which includes a format part, a railing support, and a railing crosspiece, all of which are part of the same unitary piece. A container guide railing is arranged on the railing support. The railing crosspiece connects the basic body portion to the railing support.

In some embodiments, the railing crosspiece is a plastically deformed railing crosspiece. Among these embodiments are those in which the railing crosspiece has been plastically deformed by bend forming, and those in which it has been deformed by shear forming.

Also among the embodiments are those in which the railing crosspiece has been helically twisted. Among these embodiments are those in which it has been twisted to define an angle of twist of between 15 and 135 degrees between the basic body portion and the railing support, those in which the angle of twist is 90 degrees, and those in which the railing support is oriented perpendicular to the basic body portion.

In some embodiments, the railing support is arranged on an outer edge of the basic body portion. In others, it is U-shaped. And in others, at least one edge of the railing support is deburred, chamfered, or rounded.

Embodiments include those in which the railing support, the railing crosspiece, and the basic body portion are made of a metal, those in which they are made of stainless steel, and those in which they are plastic.

In another aspect, the invention features a method for producing a guide unit for a container handling system. Such a method includes producing a basic body blank of a guide unit, the basic body blank including a basic body portion, a railing crosspiece, and a railing support for arrangement of a container guide railing, and causing a plastic deformation of the railing crosspiece.

Some practices of the invention include producing a unitary piece in which the basic body portion, the railing crosspiece, and the railing support are all integrated.

Other practices include cutting the railing crosspiece and the railing support from the basic body blank using a laser cutting device.

These and other features and advantages of the invention will be apparent from the following detailed description and its accompanying figures, in which:

DETAILED DESCRIPTION

Figure 1:
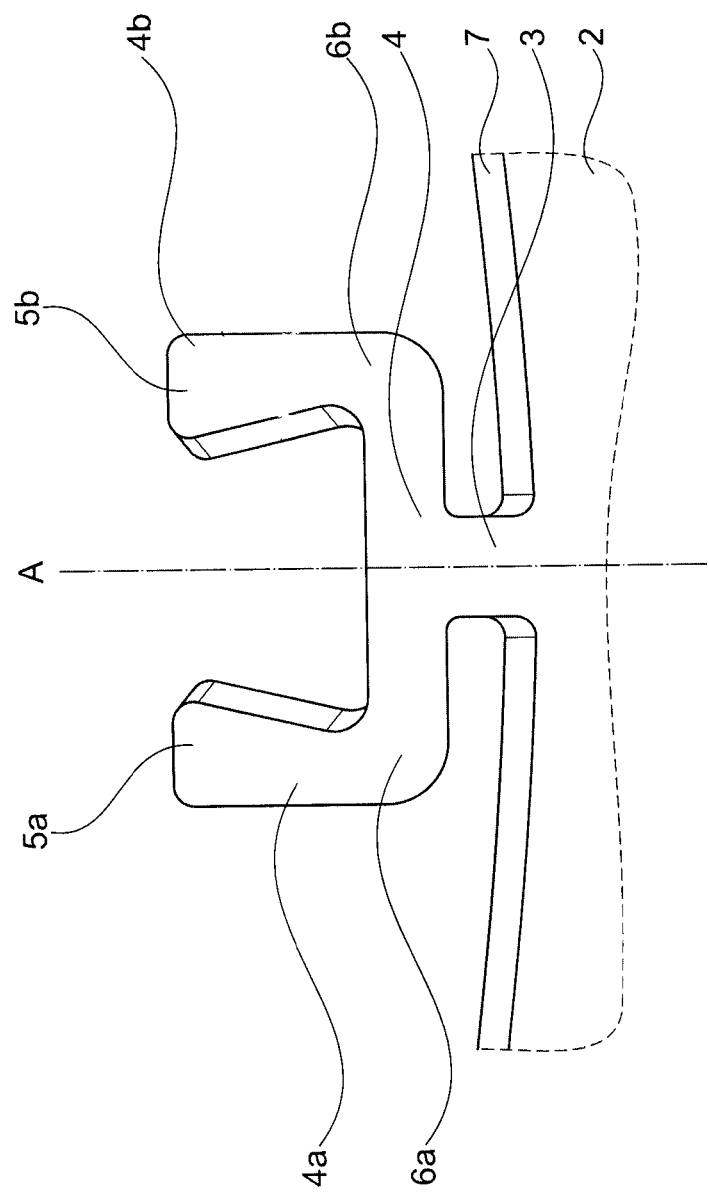
FIG. 1 shows a basic body portion blank with a railing crosspiece and a railing support cut out of the basic body blank in one piece.

FIG. 1 shows a basic body portion 2 of a format part, a railing crosspiece 3, and a U-shaped railing support 4. A basic body blank of a format part with the railing crosspiece 3 and the railing support 4 is cut out of a panel-shaped blank (not shown here) by a laser-cutting device.

The railing crosspiece 3 and the railing support 4 are arranged on an outer edge 7 of the basic body portion 2. A plurality of railing supports 4 are arranged next to one another in order to fasten a container guide railing. The U-shape of the railing supports 4 makes it possible for a T-shaped container guide railing 8, best seen in FIG. 3, to extend between railing supports 4 and to be easily inserted into the space between the vertical legs 4a, 4b.

The vertical legs 4a, 4b of the U-shaped railing support 4 have free ends 5a, 5b and connected ends 6a, 6b. The connected ends 6a, 6b connect to a support leg 4c. The free ends 5a, 5b are thicker than the connected ends 6a, 6b.

Figure 2:
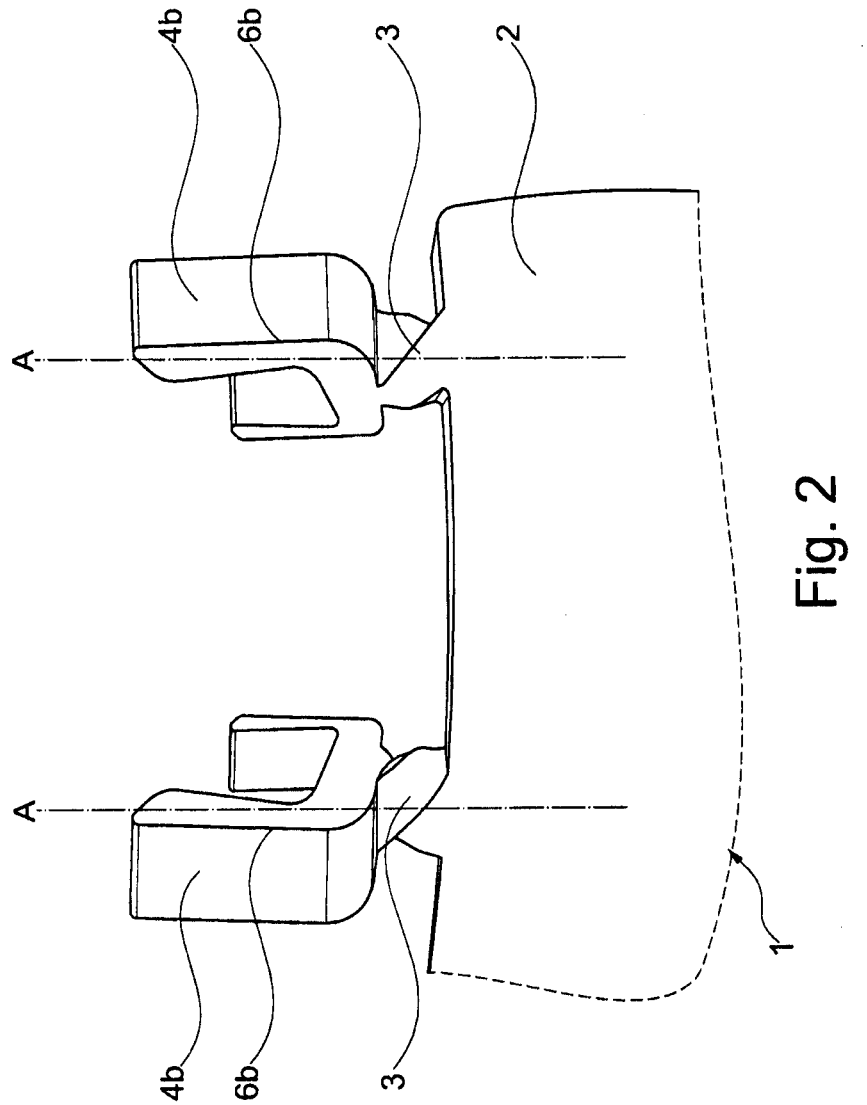
FIG. 2 shows a basic body portion having two integrally formed railing crosspieces with railing supports analogous to those in FIG. 1, with a shear-deformed railing crosspiece.

FIG. 2 shows part of a basic body blank 1 with two railing crosspieces 3, each of which has a longitudinal axis A. Each railing crosspieces 3 is helically twisted by 90° about its longitudinal axis A. The railing supports 4 are thus perpendicular to the basic body portion 2.

In some embodiments, the components are made of metal. An example of a suitable metal is stainless steel. In other embodiments, the components are made of plastic. In particular, there are embodiments in which the basic body blank 1, the basic body portion 2, the railing crosspiece 3, the railing support 4, and any combination thereof are manufactured from plastic. Among these embodiments are those in which they are manufactured from a panel-shaped plastic.

For those embodiments with one or more plastic components, it is advantageous to heat at least those regions that are to be plastically deformed prior to such deformation.

Figure 3:
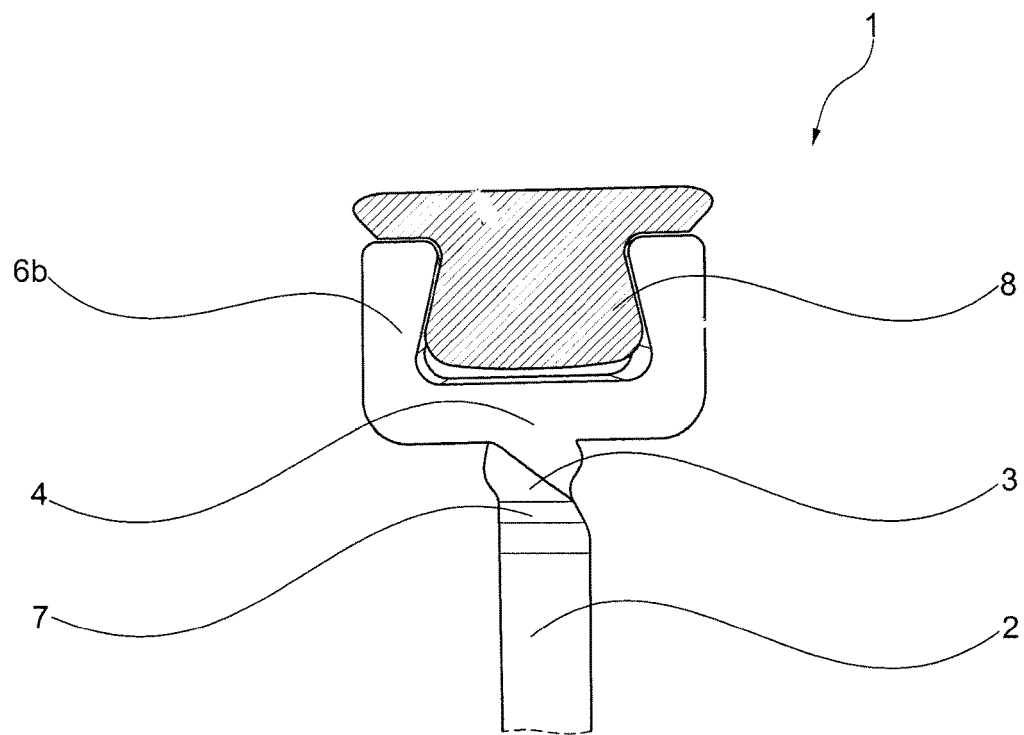
FIG. 3 shows a railing support in which a container guide railing has been inserted.

FIG. 3 shows a railing support 8 inserted into a space between vertical supports of adjacent railing supports 4.

Figure 4:
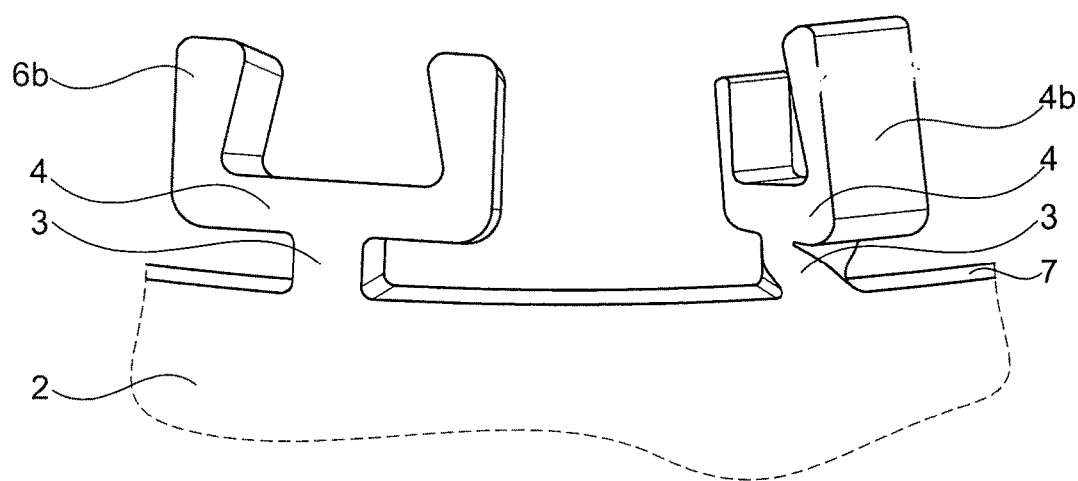
FIG. 4 shows a basic body portion blank with a deformed railing support and with a railing support that has not yet been deformed.

FIG. 4 shows a basic body portion 2 with a deformed railing support 4 on the right side of the figure and with a railing support 4 that has not yet been deformed on the left side of the figure.

Having described the invention, and a preferred embodiment thereof, what is claimed as new, and secured by Letters Patent is:

1. A manufacture for a container handling system, said manufacture comprising a guide unit, wherein said guide unit comprises a unitary piece that comprises a format part having a basic body portion, railing supports, and railing crosspieces, wherein a container guide railing rests on said railing supports, wherein each of said railing crosspieces extends between said basic body portion and a corresponding one of said railing supports, and wherein said basic body portion, said railing crosspieces, and said railing supports are integrated into said unitary piece.

2. The manufacture of claim 1, wherein at least one of said railing crosspieces is a plastically deformed railing crosspiece.

3. The manufacture of claim 2, wherein at least one of said railing crosspieces is a railing crosspiece that has been plastically deformed by shear forming.

4. The manufacture of claim 3, wherein at least one of said railing crosspieces is helically twisted.

5. The manufacture of claim 4, wherein at least one of said railing crosspieces is twisted to define an angle of twist of said railing crosspiece between said basic body portion and said railing support, wherein said angle of twist is between 15 degrees and 135 degrees.

6. The manufacture of claim 5, wherein said angle of twist is 90 degrees.

7. The manufacture of 5, wherein at least one of said railing supports is oriented perpendicular to said basic body portion.

8. The manufacture of claim 2, wherein at least one of said railing crosspieces is a railing crosspiece that has been plastically deformed by bend forming.

9. The manufacture of claim 1, wherein at least one of said railing supports is arranged on an outer edge of said basic body portion.

10. The manufacture of claim 1, wherein at least one of said railing supports is U-shaped.

11. The manufacture of claim 1, wherein at least one of said railing supports has an edge that deburred.

12. The manufacture of claim 1, wherein said railing supports, said railing crosspieces, and said basic body portion are made of a metal.

13. The manufacture of claim 1, wherein said railing supports, said railing crosspieces, and said basic body portion are made of stainless steel.

14. The manufacture of claim 1, wherein at least one of said railing supports comprises an edge, wherein said edge is a rounded edge.

15. The manufacture of claim 1, wherein said railing supports, said railing crosspieces, and said basic body portion are made of plastic.

16. The manufacture of claim 1, further comprising a chamfered edge, wherein said chamfered edge is an edge of at least one of said railing supports.

17. The manufacture of claim 1, wherein said container guide railing is nestled within said railing supports.

18. The manufacture of claim 1, wherein said railing supports directly support said container guide railing.

19. A method for producing a guide unit for a container handling system, said method comprising producing a basic body blank of a guide unit, said basic body blank comprising a basic body portion, railing crosspieces, and railing supports for arrangement of a container guide railing, and causing a plastic deformation of said railing crosspieces, said method further comprising producing a unitary piece, wherein said basic body portion, said railing crosspieces, and said railing supports are integrated into said unitary piece.

20. The method of claim 19, wherein each of said railing crosspieces extends between said basic body portion and a corresponding one of said railing supports.

21. The method of claim 19, wherein causing plastic deformation of said railing crosspieces comprises twisting said railing crosspieces.

22. The method of claim 19, wherein causing plastic deformation of said railing crosspieces comprises causing a change in an angle between each of said railing crosspieces and said basic body portion.

23. The method of claim 19, wherein causing plastic deformation of said railing crosspieces comprises causing an angle between each of said railing crosspiece and said basic body portion to change by ninety degrees.

24. The method of claim 19, further comprising, after having produced said guide unit, inserting a container guide railing in each of said railing supports.

25. A method comprising producing a guide unit for a container handling system, wherein producing said guide unit comprises producing a basic body blank of a guide unit, said basic body blank comprising a basic body portion, railing crosspieces, and railing supports for arrangement of a container guide railing, and causing plastic deformation of said railing crosspieces, said method further comprising cutting said railing crosspieces and said railing supports from said basic body blank using a laser cutting device.

* * * * *